United States Patent [19]
Bellas

[11] Patent Number: 5,897,698
[45] Date of Patent: Apr. 27, 1999

[54] NON-SETTLING, UNIVERSAL MACHINE DISPENSABLE PEARLESCENT PIGMENT DISPERSIONS

[75] Inventor: Thomas M. Bellas, Bridgewater, N.J.

[73] Assignee: Huls America Inc., Somerset, N.J.

[21] Appl. No.: 08/730,888

[22] Filed: Oct. 18, 1996

[51] Int. Cl.$^6$ ................................ C09D 1/04; C09D 5/36
[52] U.S. Cl. ..................... 106/416; 106/418; 106/436; 106/461; 106/466; 106/482; 106/475; 106/15.05; 106/626; 106/634; 523/171; 524/442
[58] Field of Search ..................................... 106/416, 418, 106/436, 461, 466, 472, 475, 482, 15.5, 415, 417, 634, 626; 523/171; 524/442, 443, 445, 450, 446

[56] References Cited

U.S. PATENT DOCUMENTS

| | | | |
|---|---|---|---|
| 3,864,294 | 2/1975 | Busch, Jr. ................................. | 106/444 |
| 5,164,433 | 11/1992 | Ricci et al. ............................... | 524/445 |
| 5,571,850 | 11/1996 | Ma et al. .................................. | 524/499 |
| 5,618,342 | 4/1997 | Herget et al. ............................ | 106/416 |
| 5,629,363 | 5/1997 | Abber et al. ............................. | 524/446 |

*Primary Examiner*—Michael Marcheschi
*Attorney, Agent, or Firm*—Abelman, Frayne & Schwab

[57] ABSTRACT

An aqueous, non-settling, universal nacreous pigment dispersion that can be used in dispensing machines for the custom mixing of retail and trade sales of alkyd or solvent-thinned and water-based surface coatings employs a synthetic silicate, sodium lithium magnesium silicate, as the suspending agent. Also disclosed are methods for preparing the dispersion which incorporates one or more carriers, humectants, surfactants and other optional conventional additives.

45 Claims, No Drawings

NON-SETTLING, UNIVERSAL MACHINE DISPENSABLE PEARLESCENT PIGMENT DISPERSIONS

FIELD OF THE INVENTION

The invention relates to an improved nacreous or pearlescent pigment dispersion that is machine dispensable for in-store tinting of aqueous and solvent-based surface coatings.

BACKGROUND OF THE INVENTION

In order to permit paint manufacturers to offer an almost limitless selection of colors to their retail and trade customers, colorant dispensing machines have been developed to permit the so-called "in-store" tinting of pigmented or clear bases at the point of sale. Advanced colorant dispensing machines have been developed that include up to twelve, or more, colorant reservoirs into which each colorant is poured, and a metered pumping and measurement system for dispensing the required amount of one or more colorants into various sized containers of base. Computer-controlled dispensing machines have reached a level of sophistication so that only the code associated with a desired end color need be entered, and the machine draws from the associated memory in selecting the colorant(s) and volume(s) required for dispensing into the container of base paint.

Once filled with its complement of pigment dispersions, the dispensing machine may not be used for extended periods of time, i.e., from overnight to longer holiday periods. Furthermore, particular colors or types of pigment dispersions may not be frequently used.

Of principal concern in any such system is the ability to reproducibly and consistently obtain precisely the same shade and/or tint of mixed paint. Since the pigments in the colorant dispersions have a tendency to settle, the colorant reservoirs or canisters are typically equipped with intermittent stirrers, and the dispensing mechanism includes a recirculating loop that permits the pigment dispersion to be periodically pumped from the reservoir through the loop and returned to the reservoir.

However, a certain portion of the colorant dispersion can remain in the dispensing nozzle between the valve in the circulating loop and the nozzle orifice. In addition, the stirring and recirculating pump systems cannot totally prevent the separation and accumulation of pigments that have a tendency to settle from the colorant dispersions. However, even small changes in the composition of the colorant caused by settling or separation of the pigment dispersion can result in noticeable variations in custom tinted paints. Various measures have been proposed by dispensing machine designers to minimize the settling and drying of the pigment dispersions once they are loaded into the machines.

In U.S. Pat. No. 5,493,840, a circular trough containing water is positioned proximate the outlets of the dispensing nozzles for the purpose of providing an atmosphere that is high in water vapor in order to inhibit the drying of the colorant dispersion in the nozzles. This apparatus further complicates an already complex piece of equipment.

In order to reduce nozzle blockage, Canadian patent document 2,118,484 discloses a stem affixed to a valve, which in the closed position occupies the tip of the nozzle and also allows circulation of the pigment dispersion through a bypass port.

Since these mechanical features are not available for existing dispensing machines that have been in use for sometime, solutions to the problems of settling and nozzle blockage must be met by formulating the pigment dispersions sold for dispensing from these machines.

Universal colorant dispersions, i.e., those that are suitable for use with either aqueous or solvent-based surface coatings, have been well-known in the art for several decades. Universal pigment dispersions containing nacreous or pearlescent pigments are also well-known to the art. Nacreous pigments, i.e., pearlescent pigments, are used for decorative effect. The original pearl essences pigments were derived from fish scales and tissue. Limited supplies of this natural resource led to the development of nacreous basic lead carbonate in the 1930's. It is not known whether the natural product is commercially available today. Inorganic nacreous pigments are available in a variety of forms and arts produced most commonly by coating a naturally occurring platelet of mica or other mineral clays with titanium dioxide, an iron oxide, or both. As used herein the terms "nacreous" and "pearlescent" are understood to be synonymous.

A wide variety of anti-settling or suspension agents have been employed in preparing pearlescent pigment oxide dispersions for use in surface coatings to reduce the tendency of the pigments to settle. Commercially acceptable formulations include at least three such agents. These suspension or anti-settling agents can include bentonite and other organo-clay mineral (hectorite) products, magnesium aluminum silicate and hydroxyethyl cellulose. The formulations employing these anti-settling agents are used for in-plant tinting of pre-mixed surface coatings where settling during shipment and storage prior to use is not a concern. This is because the shipping drums containing the pigment dispersions are equipped with efficient agitators that can maintain the dispersions as a reasonably uniform mixture and any remaining pigment can be scraped from the empty drum and added to the batch of base.

The number of colors of ready-mixed pearlescent paints must necessarily be limited by the costs of warehousing and retail shelf storage and display. Pearlescent pigment dispersions are also available in artist: supply stores, but are sold only in small tubes and are relatively expensive.

A wide variety of chemical compounds have been developed for use as suspension agents and for preparing thixotropic compositions. For example, it is know from U.S. Pat. No. 5,270,399 to employ the synthetic silicate LAPONITE® RD, which is a thixotropic agent, in preparing finished surface coating compositions employing colored pigment dispersions in water dispersible base coat compositions.

It has also been known to use synthetic silicate compositions including those sold commercially under the trademark LAPONITE® in the automotive industry with metallic and pearlescent pigments. However, it is understood that the automotive finishes are also prepared in large batches that are comparable to the in-plant manufacture of surface coatings.

However, prior to this invention, it had been found that pearlescent colorant dispersions had a tendency to settle much more rapidly than conventional dispersions and efforts to produce a non-settling nacreous pigment dispersion were unsuccessful. For this reason, pearlescent dispersions have not been available for use in the dispensing machines used for in-store tinting.

Some of the advantages and capabilities that are provided by a universal machine dispensable pearlescent pigment include (1) ready availability to consumers and to the trade at an affordable price; (2) a greatly expanded range of colors and tints; (3) the availability of custom colors for use in connection with faux and fantasy finishing techniques for residential and commercial decorating or redecorating to achieve effects that have not heretofore been possible.

It is therefore an object of this invention to provide a non-settling, universal, machine dispensable pearlescent colorant dispersion.

It is a further object of the invention to provide a method and process for the manufacture of a non-settling, universal, machine dispensable pearlescent dispersion.

It is another object of the invention to provide a nacreous or pearlescent pigment dispersion that can be employed in existing dispensing machines used for the custom tinting of aqueous and solvent-thinned paint bases.

It is yet another object of this invention to provide such a dispersion and method for its manufacture that requires only one thixotropic agent to effect a non-settling nacreous pigment composition.

Another object of the invention is to provide a universal dispersion that contains no volatile organic content ("VOC"), as defined by current government environmental regulations.

SUMMARY OF THE INVENTION

In accordance with the objectives of the invention an improved non-settling, universal nacreous pigment dispersion for use in dispensing machines for addition to surface coatings comprises a nacreous pigment component and a water-containing liquid carrier for said pigment component, where the liquid carrier component includes a dispersion of hydrous sodium lithium magnesium silicate as a thixotropic agent for suspending the pigment. The invention thus provides a nacreous or pearlescent pigment dispersion which eliminates the need for blending a plurality of suspending agents, and instead employs only a single additive for this function.

Moreover, the method of preparing the improved pearlescent pigment dispersion is simple and efficient and insures a consistent and acceptable product. The method also minimizes shear stress applied to the pigments which are subject to mechanical damage and loss of reflectivity.

The method of the invention comprises (a) forming a mixture of the hydrous sodium lithium magnesium silicate in a major portion of the water used to formulate the liquid carrier; (b) agitating the mixture at high speed for 10 to 20 minutes to effect full hydration of the silicate; (c) adding the remaining ingredients comprising the liquid component, which can include surfactants, a vehicle, at least one humectant, a biocide and defoamer; (d) adding the pearlescent pigment component; (e) adjusting the pH of the composition to 8–9; and (f) continuing to mix the ingredients at a low shear until a uniform dispersion is formed.

In accordance with one embodiment of the invention, a universal, non-settling, machine dispensable pearlescent pigment dispersion is prepared by forming an aqueous mixture of an anti-settling agent that is a synthetic silicate, namely, hydrous sodium lithium magnesium silicate, which synthetic silicate is capable of forming a stable aqueous sol, and adding to said aqueous mixture the following: a $C_2$ or $C_3$ olefinic glycol or polyglycol, a combination of surfactants compatible with aqueous and solvent-based or alkyd surface coatings, a viscosity reducer, a biocide, an optional defoamer, an aqueous alkali solution as required to adjust the pH of the dispersion to a pH of about 8–9, pearlescent oxide pigments having a particle size in the range of from about 1 to about 180 microns, but preferably in the range of from about 10 to about 60 microns, and a surfactant for wetting the pearlescent pigments.

The invention also contemplates a conventional commercial dispensing machine adapted for the in-store tinting of latex and alkyd-based surface coatings having a plurality of dispersion canisters, in which at least one of said canisters contains the improved pearlescent pigment dispersion as described above.

The pigments having utility in the invention are commercially available from several sources in the United States. One useful type of pigment consists of flat mica platelets coated with titanium dioxide, iron oxide or a combination of these oxides. The length of the platelets range from about 5 microns to 10 microns; the larger particles produce relatively greater reflectance, or pearlescent effect, and less opacity, and the smaller particles produce more of a satin luster having greater opacity.

Suitable pigments are sold by the following companies:

BASF of 3000 Continental Drive Mt. Olive, N.J. 07828 under the brand name "PALIOCROM";

EM Industries, Inc. of 5 Skyline Drive, Hawthorne, N.Y. 10532 under the trademark AFFLAIR;

Mearle Corporation of 41 E. 42nd Street New York, N.Y. 10017, under the trademark "MEARLIN LUSTER PIGMENT"; and by Semo Chemical Company, Ltd of Korea, whose products are distributed by Royale Pigments of 12 Route 17N, Paramus, N.J. 07652 under the trademark "SEMO PEARL PIGMENTS".

Other forms of pearlescent pigments are known in the art. For example EP-A-0 268 918 and EP-A-0 342 533 disclose titanium dioxide pigments having a hydrated zirconium oxide coating that exhibit improved weathering properties in non-aqueous surface coatings. A silicon dioxide coated pearlescent pigment is disclosed in U.S. Pat. No. 5,472,491, where the base pigment can be a platelet shaped mica, kaolin or glass that is coated with titanium dioxide, iron oxides (II)/(III), chromium oxide, zirconium dioxide, tin dioxide or zinc oxide, and has particular utility in water-borne coating systems.

Nacreous pigments derived from natural sources such as fish scales and tissue are also believed to be suitable for use in the practice of the invention.

Pigment oxides useful in the invention are those that produce metallic effects, including silver, gold and bronze, as well as those producing so-called earthtone colors. The dramatic effects created by the incorporation of these pigments are best achieved in surface coating bases that do not contain titanium dioxide pigments. The maximum effect is obtained in mass tone applications where the base is clear.

The pigments should be mixed using a mixer or agitator with low shear forces to avoid or minimize fracturing of the platelets. Mixing should be discontinued once a uniform dispersion has been obtained.

The thixotropic or suspension additive which has been found to be most effective as an anti-settling agent is hydrous sodium lithium magnesium silicate. When formulated in accordance with the invention, use of this synthetic silicate will maintain the nacreous pigments in the universal dispersion and permit use of the dispersion in dispensing machines for in-store mixing with appropriate bases. As used hereinafter the term "synthetic silicate" will be understood to mean hydrous sodium lithium magnesium silicate. It has properties which permit the formation of stable aqueous sols which resist gelling, or which can be maintained as a flowable liquid under low shear conditions. A synthetic silicate composition of this type is sold under the brand name LAPONITE® by Southern Clay Products of 1212 Church Street, Gonzales, Tex. 78629.

The grade of the LAPONITE® silicate which has been found to be satisfactory for use in the invention is LAPONITE-RD. A second form of this synthetic silicate containing a peptiser, or peptising agent, is available under the designation LAPONITE-RDS. The preparation of one form of this synthetic silicate composition is described in U.S. Pat. No. 3,654,176. The viscosity modifying properties and storage capabilities of the peptiser-containing silicate identified as LAPONITE®-RDS were found to provide no particular advantages in the practice of the invention.

In the examples which follow, the synthetic silicate is added to tap water in a vessel equipped with a Cowles mixer and agitated for approximately 15 minutes in order to effect complete hydration of the synthetic silicate. Immediately thereafter, the remaining ingredients of the formulation are added, while continuing agitation. The order of addition can include an additional carrier or vehicle; one or more humectants, such as diethylene glycol monomethyl ether and hydroxyethylethylene urea ("HEEU"); conventional surfactants of the types customarily employed in universal dispersions, to include a surfactant to facilitate wetting and blending of the nacreous pigment or pigments; a biocide; an anti-foam agent and the pigment(s). As certain surfactants, such as nonyl phenol, and its ethoxylates, are known to cause foaming, its addition can be delayed until after addition of the pigments. The pH of the composition is brought to about 8–9 using a dilute aqueous alkali, such as a 50% potassium hydroxide solution. Mixing is continued for the minimum time required to achieve a uniform composition.

Suitable formulations for preparing universal non-settling nacreous pigments for use in dispensing machines can contain ingredients in the ranges indicated, all in parts by weight:

Water 1–50 parts

Synthetic silicate 0.1–2.0 parts

Carrier (glycol) 8–50 parts

Humectant 3–15 parts

Surfactants 1–15 parts

Nacreous Pigment(s) 1–50 parts

Base (for pH adj.) As needed

Biocide (optional) 0.05–0.2 parts

Defoamer As needed

In a preferred embodiment of the invention that is adapted to provide a dispersion of pearlescent pigments for incorporation in architectural finishes and surface coatings of both the alkyd and water-borne types by way of in-store dispensing machines, the non-settling dispersion comprises the following ingredients in the ranges indicated all being in part by weight:

Water 35–50 parts

Synthetic silicate 1.0–2.0 parts

Carrier (glycol) 8–15 parts

Humectant 3–8 parts

Surfactants 7–10 parts

Nacreous Pigment(s) 10–33 parts

Base (for pH adj.) As needed

Biocide (optional) 0.05–0.2 parts

Defoamer As needed

Under present regulatory standards, ethylene glycol and propylene glycol are deemed to contribute to the VOC of products in which they are incorporated. Polyethylene glycol ("PEG") and higher polyglycols can be substituted for some or all of the other glycols to reduce or eliminate these VOC constituents. PEG having an average molecular weight of from about 200 to about 700 can be utilized.

The following universal nacreous pigment dispersions were prepared using pigments that produced a silver and gold pearlescent effect when the dispersions were added to water-borne and alkyd clear bases to which other colorant dispersions were also added.

| | Quantity | |
|---|---|---|
| Component | A (Silver) | B (Gold) |
| Water | 44.0 | 44.0 |
| Synthetic silicate[1] | 1.6 | 1.6 |
| Carrier (propylene gycol) | 10.0 | 10.0 |
| Humectant[2] | 5.0 | 5.0 |
| Surfactants | | |
| Soya lecithin | 3.0 | 3.0 |
| Cationic[3] | 2.0 | 2.0 |
| Nonyl phenol[4] | 2.0 | 2.0 |
| Pigment surfactant[5] | 2.0 | 2.0 |
| Biocide[6] | 0.1 | 0.1 |
| Anti-foam | 0.2 | 0.2 |
| Nacreous Pigment | 30.0[7] | 30.0[8] |

[1]Hydrous sodium lithium magnesium silicate (LaPonite ® RD)
[2]Diethylene glycol monomethyl ether
[3]Polyoxyethylated alkylamine
[4]Add after pigment with 2–3 parts reserved water
[5]Potassium salt of phosphate coester
[6]NUOCEPT ® 95 (Huls America)
[7]AFFLAIR ® 103 (EM Industries)
[8]AFFLAIR ® 309 (EM Industries)

The nacreous pigment dispersions of Examples A and B were discharged from the mixing vessel into friction top pint cans and sealed. After three weeks of heat aging at 120° F. and at ambient temperature, the containers were opened and some synthesis was observed. No settling was evident, and a uniform dispersion was produced with thirty seconds of hand stirring.

Thereafter the dispersions of Examples A and B are put into the reservoir canister of a standard dispensing machine.

Pearlescent pigment dispersions comparable to those of Examples A and B were added to the clear or transparent bases indicated below and thoroughly mixed with the conventional universal colorants indicated to produce surface coating compositions:

Water Based

One gallon container (116 fluid ounces) of high gloss clear

Ten ounces of pearlescent dispersion—Example A

Two ounces of colored pigment dispersion—
Trhalo blue COLORTREND® 888 (Huls America)

Alkyd/Solvent-Based

One gallon container (116 fluid ounces) of high gloss clear

Ten ounces of pearlescent dispersion—Example B

Two ounces of colored pigment dispersion—
Bone black GPD® 824 (HUls America)

The surface coating compositions were applied with brush, roller and by spraying to wall surfaces to produce an iridescent or lustrous effect comparable to that obtained by the use of factory-mixed pearlescent paints.

The surface coatings containing the pearlescent pigment dispersions of the invention can be applied to previously painted walls and other surfaces to create faux or fantasy effects that have not previously been available to trade painters and interior decorators, let alone to the do-it-yourself category of home decorators. The surface can be painted with a pastel midtone, accent or deep color, which is preferably in a flat finish. Best effects and results are achieved by using transparent or semi-transparent colors, such as phthalo blue, ,phthalo green, red, black, especially bone black, violet, magenta, van dyke brown, and transparent red and yellow oxides. Inorganic colors can also be utilized, but have a tendency to mask or reduce the pearlescent effects.

The surface coating composition containing the pearlescent dispersion of the invention can be applied over the base coat by sponging, rag rolling, bagging, block printing, feathering and stenciling. The finished painted surface can be made to appear to be a seamless wallpaper. Unlike wallpaper which must generally be removed when replacement or redecorating is desired, the faux finishes incorporating the pearlescent dispersions of my invention can simply be painted over with a flat base or primer.

I claim:

1. An improved pearlescent universal pigment dispersion composition for use in surface coatings which pearlescent pigment dispersion composition includes (a) pearlescent pigment component and (b) a water-containing liquid component that is a carrier for said pigment component, the improvement which comprises a dispersion in said liquid carrier component of hydrous sodium lithium magnesium silicate as a thixotropic agent in an amount which is effective to suspend the pearlescent pigment in said composition.

2. The composition of claim 1 which contains from about 10 to about 33 parts by weight of component (a), and component (b) comprises:
   (i) from about 1.0 to about 2.0 parts by weight of hydrous sodium lithium magnesium silicate;
   (ii) from about 1 to 50 parts by weight of water;
   (iii) from about 8 to about 50 parts of a glycol selected from the group consisting of ethylene glycol, diethylene glycol, polyethylene glycol and propylene glycol; and
   (iv) from about 1 to about 15 parts by weight of one or more surfactants.

3. The composition of claim 1 where component (a) comprises metal oxide-coated mica.

4. The composition of claim 1 which contains from about 25 to 30 parts by weight of component (a) and from about 1.3 to 1.6 parts by weight of hydrous sodium lithium magnesium silicate.

5. The composition of claim 1 having a pH in the range of from about 8 to 9.

6. The composition of claim 1 which further comprises one or more of the following additives: a viscosity reducing additive, a biocide, a defoamer or a pH control agent.

7. A surface coating composition comprising a transparent base and the pearlescent pigment dispersion composition of claim 1.

8. The composition of claim 7 which further comprises at least one colored pigment.

9. The composition of claim 8 in which the at least one colored pigment produces a transparent color in the surface coating composition.

10. The composition of claim 8 in which the at least one colored pigment is bone black.

11. A method of preparing a universal, non-settling nacreous pigment dispersion for use in in-store dispensing machines, said method comprising the steps of:
    (a) dissolving from about 1.0 to about 2.0 parts by weight of hydrous sodium lithium magnesium silicate in from about 35 to 50 parts by weight of water to form a solution;
    (b) while agitating the solution of step (a), adding the following to form a mixture having a pH:
       (i) from about 8 to about 12 parts by weight of one or more glycols selected from the group consisting of ethylene glycol, diethylene glycol, polyethylene glycol and propylene glycol,
       (ii) from about 7 to about 10 parts by weight of one or more surfactants, and
       (iii) from about 10 to about 33 parts by weight of nacreous pigments;
    (c) determining and adjusting the pH of the mixture of step (b) to the range of 8 to 9; and
    (d) continuing to agitate the mixture of step (c) until a dispersion of uniform consistency is formed.

12. The method of claim 11 where step (b) further comprises the step of adding from about 3 to about 8 parts of a humectant selected from the group consisting of diethylene glycol monomethyl ether and hydroxyethylethylene urea.

13. The method of claim 11 where step (b) further comprises the step of adding from about 0.1 to about 0.3 parts by weight of a defoaming agent.

14. The method of claim 13 which further includes after step (c) adding from about 1.5 to about 2.5 parts of nonylphenol.

15. The method of claim 11 where the nacreous pigment is added in the form of a dry powder.

16. The method of claim 11 where the nacreous pigment contains sufficient water to form a free-flowing powder of reduced dust control.

17. The method of claim 11 where the pH is adjusted by addition of an aqueous alkali.

18. The method of claim 11 where the nacreous pigments are metal oxide-coated mica.

19. The method of claim 18 where the mixture is agitated in step (b) for about ten minutes after addition of the nacreous pigments.

20. The method of claim 18 where the agitation of steps (b) and (d) is conducted at a shear energy below that at which the nacreous pigments will fracture.

21. A latex water-based surface coating composition comprising from about one percent to about ten percent by volume of the pearlescent pigment dispersion composition of claim 1.

22. An alkyd resin-based surface coating composition comprising from about one percent to about ten percent by volume of the pearlescent pigment dispersion composition of claim 1.

23. A surface coating composition comprising (a) a base selected from the group consisting of alkyd bases and aqueous bases, (b) from about one percent to about ten percent by volume of the pearlescent pigment dispersion composition of claim 1, and (c) from about 0.2 percent to about 2 percent by volume of a colorant.

24. An improved aqueous universal nacreous pigment dispersion composition for use in colorant dispensing machines that is non-settling which dispersion composition comprises (a) a minor amount by weight of said composition of at least one nacreous pigment and (b) hydrous sodium lithium magnesium silicate in an amount that is effective to form a thixotropic mixture to suspend said nacreous pigment in said composition.

25. The dispersion composition of claim 24 in which the at least one nacreous pigment comprises metal oxide-coated mica.

26. The dispersion composition of claim 25 where the nacreous pigment comprises mica platelets coated with titanium dioxide, or iron oxide, or both.

27. The dispersion composition of claim 26 which contains from about 15 to about 33 parts by weight of nacreous pigment.

28. The dispersion composition of claim 24 which further comprises at least one carrier selected from the group consisting of ethylene glycol, diethylene glycol, polyethylene glycol and propylene glycol.

29. The dispersion composition of claim 24 which further includes one or more surfactants selected from the group consisting of anionic, cationic and non-ionic surfactants.

30. The dispersion composition of claim 29 in which the surfacants comprise nonylphenol.

31. The dispersion composition of claim 26 which has a pH that is in the range of from 8 to 9.

32. The dispersion composition of claim 24 which further comprises a biocide.

33. A universal non-settling nacreous pigment dispersion for use in dispensing machines, said dispersion comprising:
   (a) from about 1 to about 50 parts by weight of nacreous pigments;
   (b) from about 0.1 to about 2.0 parts by weight of a hydrous sodium lithium magnesion silicate that is a thixotropic agent for suspending the nacreous pigments;
   (c) from about 1 to 50 parts by weight of water;
   (d) from about 8 to about 50 parts of a glycol carrier selected from the group consisting of ethylene glycol, diethylene glycol, polyethylene glycol and propylene glycol; and
   (e) from about 1 to about 15 parts by weight of one or more surfactants.

34. The nacreous pigment dispersion of claim 33 where the nacreous pigments comprise metal oxide-coated mica.

35. The nacreous pigment dispersion of claim 34 where the mica is coated with titanium dioxide or iron oxide, or both.

36. The nacreous pigment dispersion of claim 3 which has a ratio of silicate to nacreous pigments of from about 1:10 to about 1:33.

37. The nacreous pigment dispersion of claim 36 where the ratio is from about 1:15 to about 1:20.

38. The nacreous pigment dispersion of claim 33 which contains from about 25 to 30 parts by weight of nacreous pigment and from about 1.3 to 1.6 parts by weight of the silicate.

39. The nacreous pigment dispersion of claim 33 which further comprises one or more of the following additives: a viscosity reducing additive, a biocide, a defoamer or a pH control agent.

40. The nacreous pigment dispersion of claim 39 which has a pH in the range of 8 to 9.

41. The nacreous pigment dispersion of claim 39 further comprising a humectant selected from the group consisting of diethylene glycol monomethyl ether and hydroxyethylethylene urea.

42. A surface coating composition comprising a transparent base and the nacreous pigment dispersion composition of claim 38.

43. The surface coating composition of claim 42 which further comprises at least one colored pigment.

44. The composition of claim 43 in which the at least one colored pigment produces a transparent color in the surface coating composition.

45. The composition of claim 43 in which the at least one colored pigment is bone black.

* * * * *

UNITED STATES PATENT AND TRADEMARK OFFICE
CERTIFICATE OF CORRECTION

PATENT NO. : 5,897,698
DATED : April 27, 1999
INVENTOR(S) : Thomas M. Bellas

It is certified that error appears in the above-identified patent and that said Letters Patent is hereby corrected as shown below:

Column 8, claim 16, line 3, delete "control" and insert --content--;

Column 10, claim 36, line 1, delete "3" and insert --33--.

Signed and Sealed this

Thirty-first Day of August, 1999

Attest:

Q. TODD DICKINSON

Attesting Officer       Acting Commissioner of Patents and Trademarks